(12) United States Patent
Oohashi

(10) Patent No.: US 7,786,632 B2
(45) Date of Patent: Aug. 31, 2010

(54) TERMINAL DEVICE FOR VEHICLE AC GENERATOR

(75) Inventor: Atsushi Oohashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 321 days.

(21) Appl. No.: 11/945,654

(22) Filed: Nov. 27, 2007

(65) Prior Publication Data

US 2008/0238225 A1     Oct. 2, 2008

(30) Foreign Application Priority Data

Mar. 26, 2007   (JP) .............................. 2007-078939

(51) Int. Cl.
*H02K 11/00* (2006.01)
(52) U.S. Cl. .............................. 310/71; 310/43; 310/239
(58) Field of Classification Search ................... 310/43, 310/71, 239; *H02K 11/00*
See application file for complete search history.

(56) References Cited

U.S. PATENT DOCUMENTS

| | | | | |
|---|---|---|---|---|
| 5,686,780 A | * | 11/1997 | Adachi et al. ............. | 310/68 D |
| 6,525,439 B2 | * | 2/2003 | Whelan et al. ............ | 310/68 R |
| 6,841,856 B1 | * | 1/2005 | Hayashi et al. ............. | 257/670 |
| 6,954,013 B2 | * | 10/2005 | Balszunat et al. ......... | 310/68 D |
| 7,411,324 B2 | * | 8/2008 | Kusumi ..................... | 310/68 D |
| 7,471,002 B2 | * | 12/2008 | Konishi ....................... | 290/31 |

FOREIGN PATENT DOCUMENTS

| | | |
|---|---|---|
| JP | 06178518 A | 6/1994 |
| JP | 11-113208 A | 4/1999 |
| JP | 2001-016829 A | 1/2001 |
| JP | 2004-248354 A | 9/2004 |

* cited by examiner

*Primary Examiner*—Quyen Leung
*Assistant Examiner*—John K Kim
(74) *Attorney, Agent, or Firm*—Sughrue Mion, PLLC

(57) ABSTRACT

A terminal device for a vehicle AC generator including a common base terminal group 100A1 having a plurality of terminals and an external connector terminal 200A1 formed by integrating a plurality of individual connector terminals having connecting terminals with respect to the external device at one ends thereof and having connecting terminal portions to be connected to a regulator circuit at the other ends thereof by premolding with respect to each other, in which the external connector terminal is arranged at predetermined positions of the common base terminal group, and the common base terminal group and the external connector terminal are integrally mold-formed with resin.

7 Claims, 9 Drawing Sheets

TERMINAL DEVICE FOR VEHICLE AC GENERATOR

BACKGROUND OF THE INVENTION

1. Field of the Invention

The present invention relates to a terminal device for a vehicle AC generator and, more specifically, to a structure of the terminal device in a regulator assembly for the vehicle AC generator in which connector connecting terminals (external connector terminals) which correspond respectively to vehicle side connectors having various number of external connecting terminals and having various orientations and shapes, and a generator-controlling common connecting terminal (common base terminal group) are integrally molded.

2. Description of the Related Art

An example of the terminal device for a vehicle AC generator in the related art in which the connector connecting terminals which corresponds to the vehicle side connectors (hereinafter, referred to as external connector terminals) and a control connecting terminal which corresponds to the contents of control of the generator (hereinafter, referred to as common base terminal group) are integrally molded is disclosed in JP-A-11-113208 (hereinafter referred to as Patent Document 1).

In JP-A-2004-248354 (hereinafter, referred to as Patent Document 2) discloses a terminal device for a vehicle AC generator including a plurality of individual connectors (external connector terminals) having different shape for the connection with an external circuit and a common connector (common base terminal group) having terminals for connecting the regulator with internal circuits such as a rectifier device or a rotor, and using the same common connector and changing the individual connectors according to the required specification thereby being compatible to various vehicle AC generators.

However, in the device disclosed in Patent Document 1, the three external connector terminals for the connection (external connector terminals) with the external devices are configured integrally with the common base terminal group, and hence cannot be replaced. Therefore, the device is not adaptable to a type having the external connector terminals for the connection with the external device oriented in the different directions, or having the different number of terminals, so that it is inevitable to change on the brush holder basis. Therefore, it cannot be adapted flexibly to the applications of various types of eternal connector terminals, which is required by car manufacturers.

In the device disclosed in Patent Document 2, there are problems such that (1) since a plurality of terminals which abut against each other are joined by soldering or welding for electrically connecting the common connector (common base terminal group) and the individual connectors (external connector terminals), processes which require fine and reliable operations in a relatively small space abruptly increase, and hence the manufacturing cost increases accordingly;

(2) since a connector case is configured by fitting a case of the common connector and the case of the individual connectors to each other, the configuration of the connector case is complicated, which results in high cost; and (3) it is necessary to secure insulation between adjacent terminal pairs by coating the pairs of common connector and the individual connectors with insulating resin or by fitting a molded cap formed by insulating member, which results in further increase in number of processes and increase in cost.

SUMMARY OF THE INVENTION

In order to solve the above-described problems, it is an object of the present invention to provide a terminal device for the vehicle AC generator which is easily adaptable for various vehicle-side connectors which have various numbers of the external connecting terminals and have various orientations shapes and which achieves low manufacturing cost and high reliability.

A terminal device for a vehicle AC generator according to the present invention includes: a common base terminal group having a plurality of terminals such as a brush terminal, an earth terminal, and a battery terminal to be connected to internal circuits of a vehicle AC generator; and an external connector terminal formed by integrating a plurality of individual connector terminals including connecting terminals which serve as connector units with respect to the external device at one ends thereof and having connecting terminal portions to be connected to a regulator circuit at the other ends thereof by premolding with respect to each other, and a brush holder for holding brushes, a storage for storing circuit boards of the regulator, a holding unit for holding the common base terminal group and the external connector terminal, and the connector unit of the external connector terminal are integrated by combining the external connector terminals with the common base terminal group and arranging them at predetermined positions of the common base terminal group, and integrally molding the common base terminal group with the external connector terminal with resin.

According to the terminal device for a vehicle AC generator in the present invention, a terminal device for the vehicle AC generator which is easily adaptable for various vehicle-side connectors which have various numbers of the external connecting terminals and have various orientations and shapes and which achieves low manufacturing cost and high reliability is obtained.

Above-described and other objects, characteristics and advantages of the present invention will be apparent from a detailed description and a description of drawings in the embodiment shown below.

BRIEF DESCRIPTION OF THE DRAWINGS

FIG. 4 illustrates a configuration of the regulator assembly according to the first embodiment of the present invention, in which

DESCRIPTION OF THE PREFERRED EMBODIMENTS

First Embodiment

Figure 1:
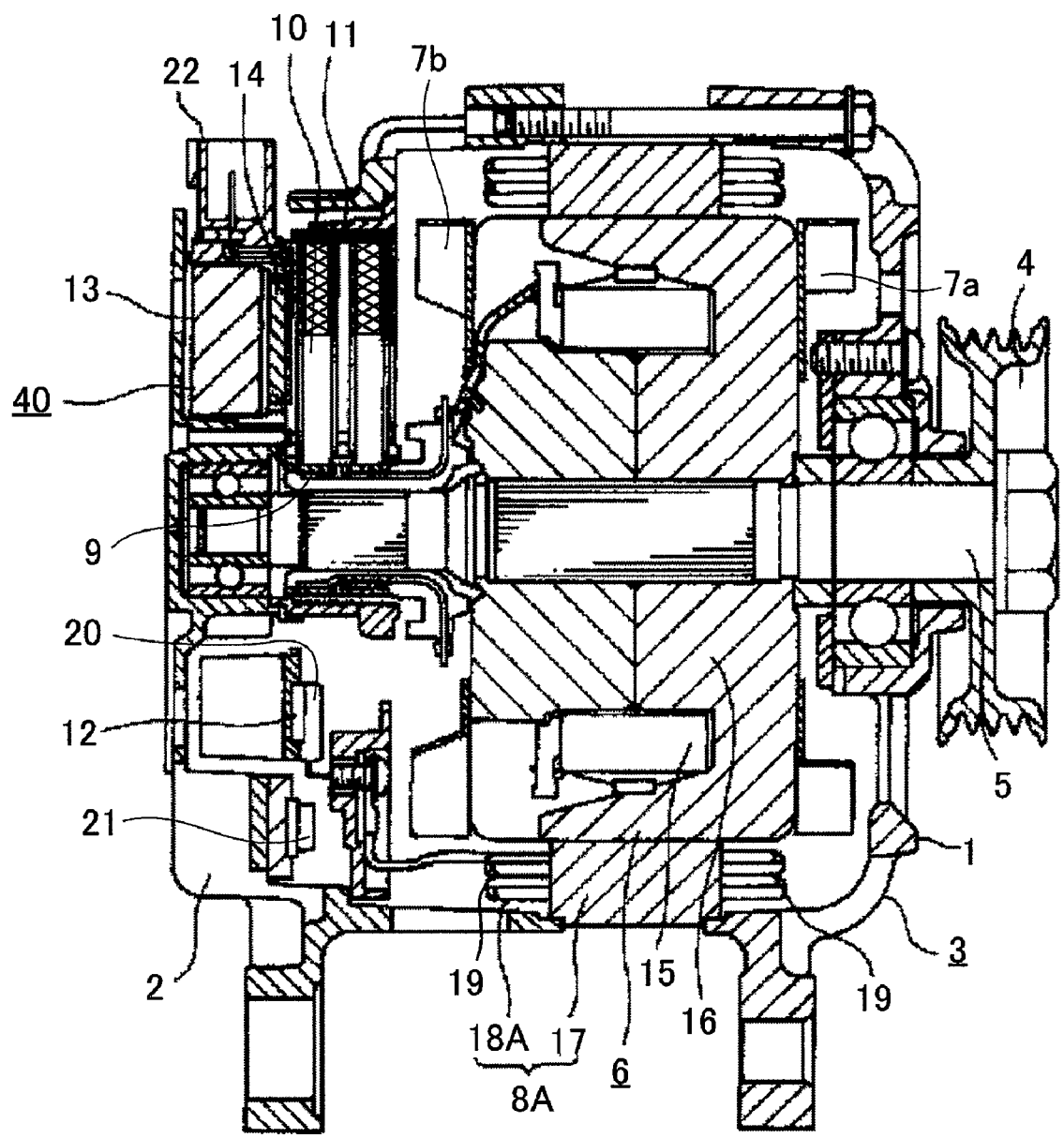
FIG. 1 is a cross-sectional view showing a general configuration of a vehicle AC generator having a terminal device according to a first embodiment of the present invention.

FIG. 1 is a cross-sectional view showing a general configuration of a vehicle AC generator having a terminal device according to a first embodiment of the present invention. The vehicle AC generator includes a case 3 having a front bracket 1 and a rear bracket 2 formed of aluminum, a shaft 5 provided in the case 3 and having a pulley 4 fixed to one end thereof, a claw-pole rotor 6 fixed to the shaft 5, fans 7a, 7b fixed to both end surfaces of the rotor 6 in terms of the axial direction, a stator iron-core 17 fixed in the case 3, a stator coil 18A stored in a slot of the stator iron-core 17, a stator 8A having the stator iron-core 17 and the Stator coil 18A, a slip ring 9 fixed to the other end of the shaft 5 for supplying electric current to the rotor 6, a pair of brushes 10 being sliding contact with the slip ring 9, a brush holder 11 for storing the brushes 10, a rectifier 12 electrically connected to the stator coil 18A for rectifying an AC current generated in the stator coil 18A into a DC current, a heat sink 13 fitted to the brush holder 11, and a regulator 14 fitted to the heat sink 13 for regulating the DC voltage generated in the stator coil 18A.

A connector 22 to which an external plug is mounted is arranged in the vicinity of the regulator 14. The regulator 14, the brush holder 11 and the connector 22 constitute a regulator assembly 40.

The rotor 6 includes a rotor coil 15 generating a magnetic flux with a flow of an electric current, and a pole core 16 provided so as to cover the rotor coil 15 and on which a magnetic pole is generated by the magnetic flux. The pole core 16 includes the cooling fans 7a, 7b on end surfaces in terms of the axial direction thereof.

The stator 8A includes the stator iron-core 17 through which a revolving magnetic field generated by the rotor 6, and the stator coil 18A having a rectangular cross-section in a slot through which the AC output current is flown by the revolving magnetic field, and the stator coil 18A is formed with coil ends 19 at both ends in terms of the axial direction of the stator iron-core 17.

Figure 2:
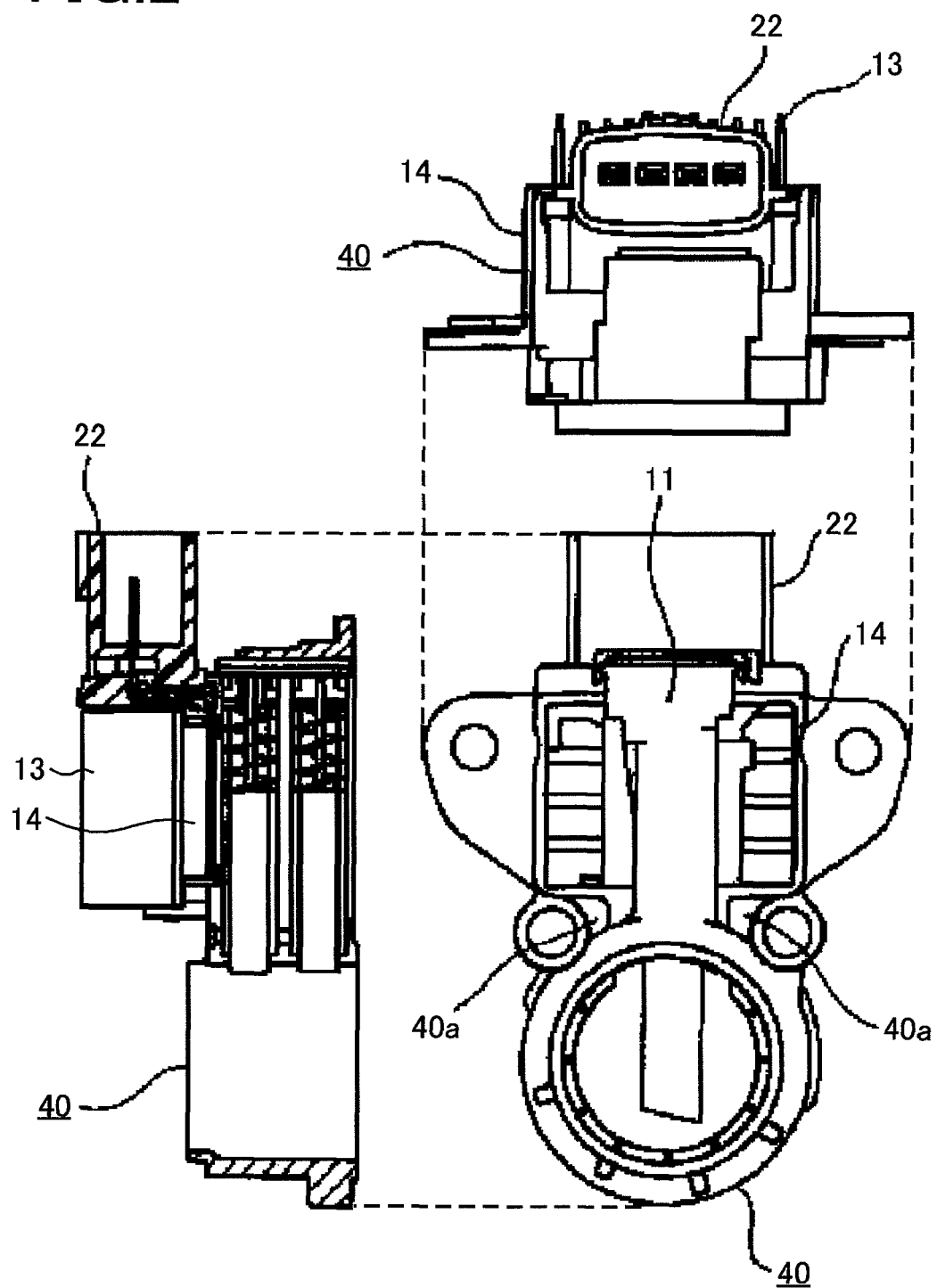
FIG. 2 illustrates the regulator assembly 40 when viewed form the front, top, and side, according to the first embodiment of the invention.

FIG. 2 illustrates the regulator assembly 40 when viewed form the front, top, side (partially in cross-section). In the regulator assembly 40 according to the first embodiment, the regulator 14 and the brush holder 11 are disposed so as to overlapped with respect to each other in the direction of the axis of the shaft 5, the connector 22 is provided radially outside the regulator 14 and adjacent to the regulator 14 with an opening thereof faced in the radial direction. FIG. 2 shows a case in which there are four external connector terminals, described later. The three members; the brush holder 11, the regulator 14 and the connector 22 are formed integrally by molding. Center lines of the three members; the brush holder 11, the regulator 14 and the connector 22 are disposed on the same plane passing through the center line of the shafts 5 and extending in the radial direction. The brush holder 11 is formed with vent holes 40a on both sides thereof. The regulator 14 includes the heat sink 13 having a plurality of fins on the rear side.

Figure 3:
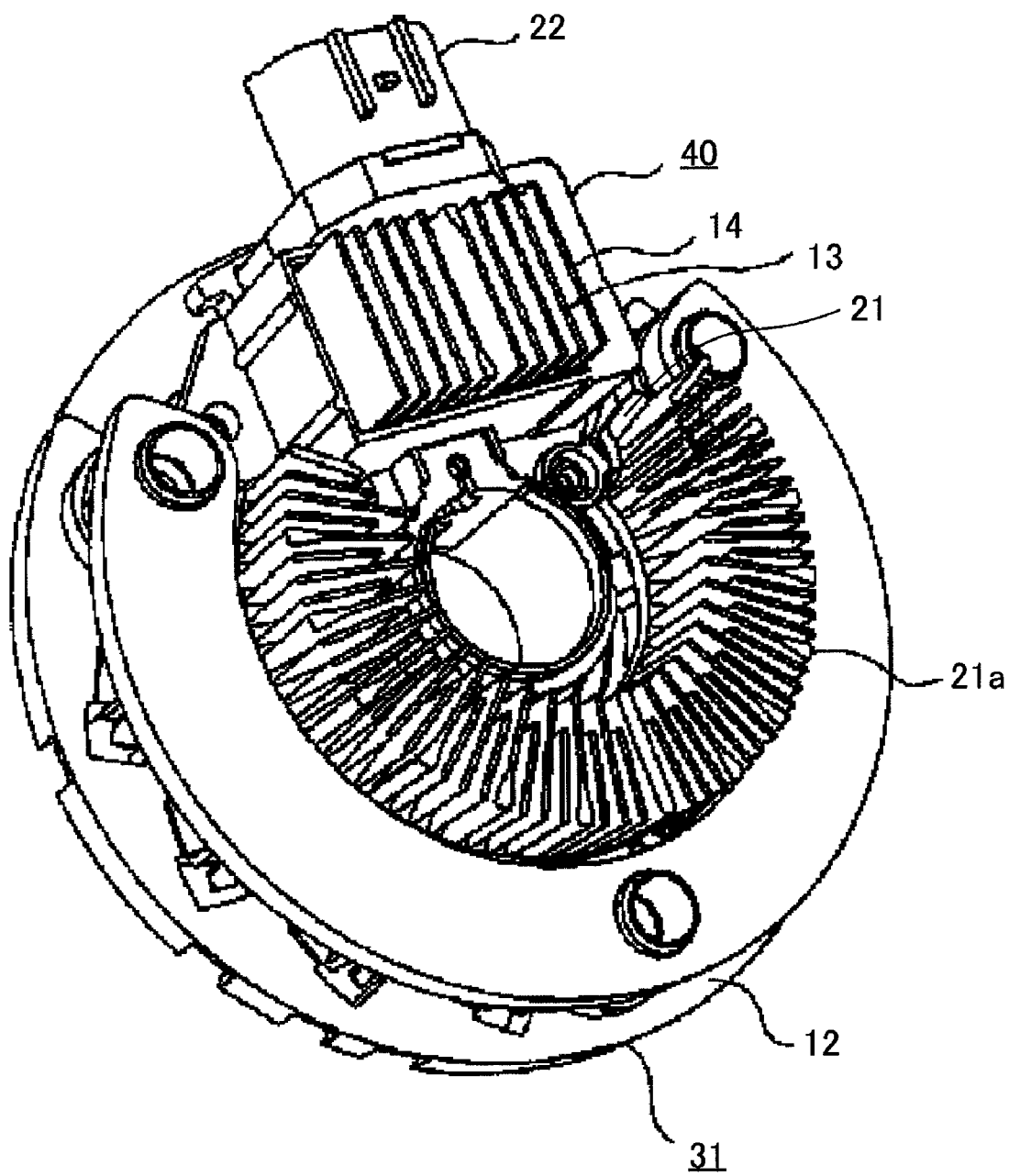
FIG. 3 is a perspective view of a regulator/rectifier assembly having a rectifier assembly and a regulator assembly assembled to each other.

FIG. 3 is a perspective view of a regulator/rectifier assembly having a rectifier assembly 31 and a regulator assembly 40 assembled to each other. In the rectifier assembly 31, the rectifier 12 includes a diode 20 mounted onto a substantially C-shaped heat sink 21. The heat sink 21 includes a plurality of fins 21a on the rear side.

Referring now to FIG. 4 to FIG. 6, a configuration and an assembly procedure of a terminal device of the regulator assembly 40 which is a main part of the invention will be described in detail. In these drawings, the same or corresponding parts are represented by the same reference numerals.

FIG. 4 illustrates a configuration of the regulator assembly 40 according to the first embodiment of the invention.

Figure 4A:
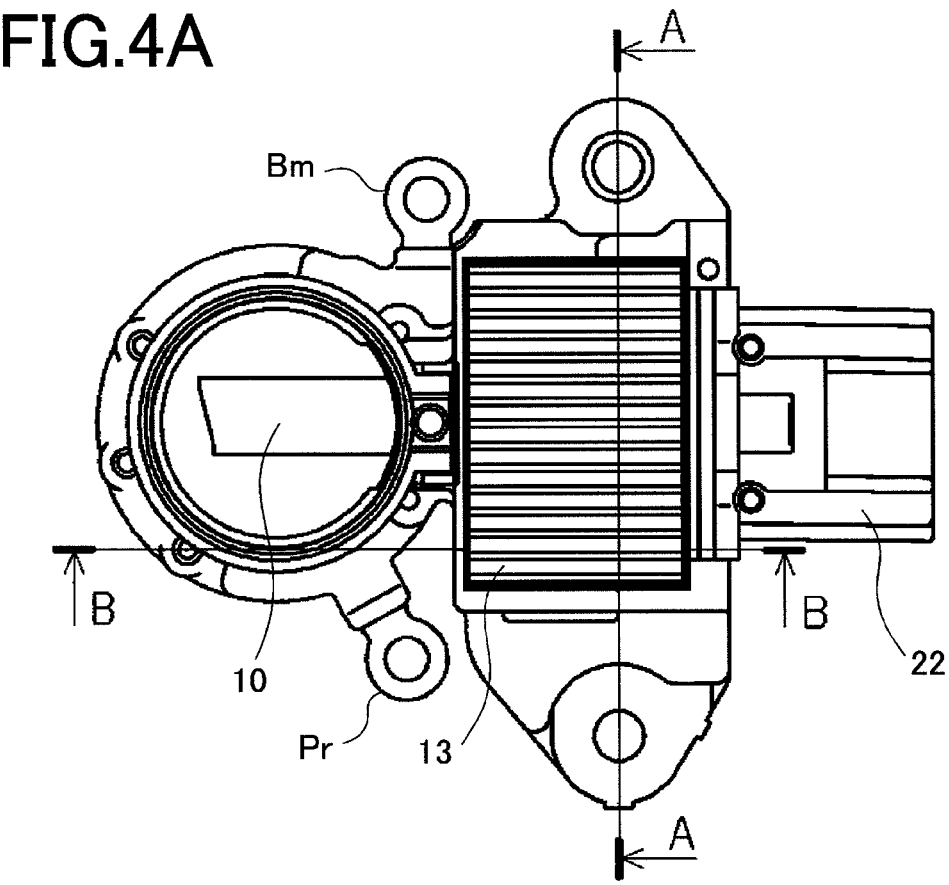
FIG. 4A is a front view when viewed in the axial direction.
Figure 4B:
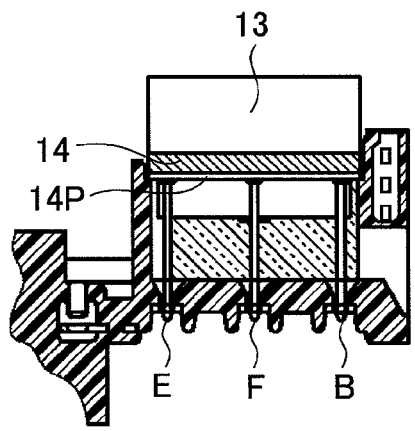
FIG. 4B is a cross-sectional view taken along the line B-B in FIG. 4A.
Figure 4C:
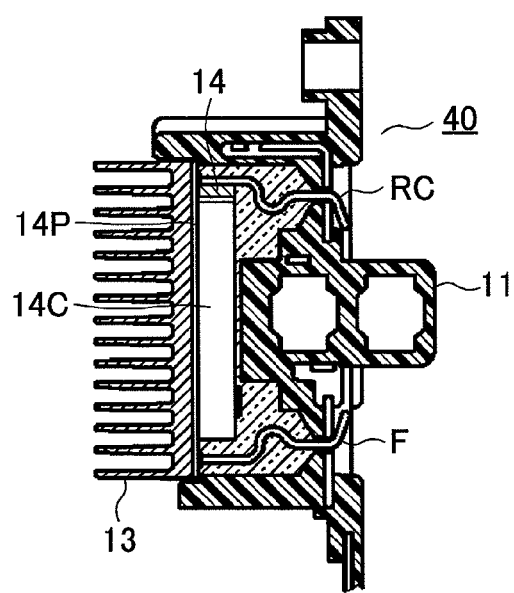
FIG. 4C is a cross-sectional view taken along the line A-A in FIG. 4A.

FIG. 4A is a front view when viewed in the axial direction; FIG. 4B is a cross-sectional view taken along the line B-B in FIG. 4A, FIG. 4C is a cross-sectional view taken along the line A-A in FIG. 4A, in which the brushes 10 is omitted. FIG. 5 and FIG. 6 show configurations of a common base terminal group and an external connector terminal, and a procedure for unifying these members. FIG. 5 illustrates a case in which the number of terminals of the external connector terminal is three, and FIG. 6 illustrates a case in which the number of terminals of the external connector terminal is four.

In FIG. 4, the regulator 14 includes a regulator substrate 14P bonded to the heat sink 13, a hybrid integrated circuit mounted to the regulator substrate 14P on the opposite side from the heat sink, a case 14C for covering the hybrid integrated circuit, and seven (eight if the number of terminals of the external connector terminal is four) lead wires derived from a conductor of the regulator substrate 14P toward the side opposite from the heat sink. The lead wires are inserted into respective connecting holes of a terminal B, a terminal F, a terminal E and a terminal P of a common base terminal group 100A1 (or 100A2), described later, and simultaneously, inserted into respective connecting holes of a terminal A, a terminal RC, a terminal L1 of the external connector terminal 200A1, described later (or a terminal FR, a terminal L, a terminal S and a terminal G of the external connector terminal 200A2), and are soldered.

Referring now to FIG. 5, configurations of the respective terminals will be described.

Figure 5A:
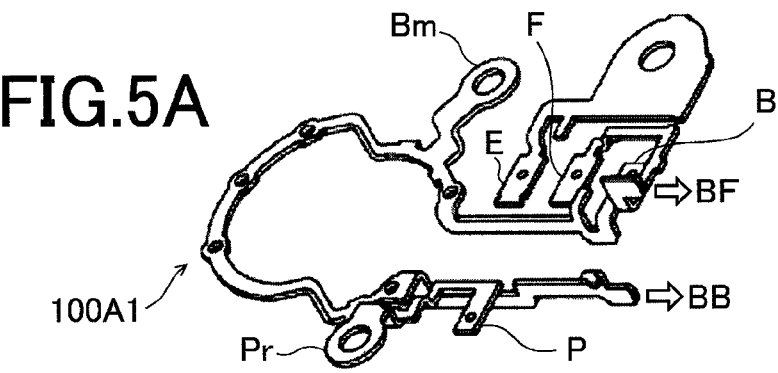
FIG. 5 shows configurations of a common base terminal group and an internal connector terminal, and a procedure for unifying these members according to the first embodiment of the invention.

As shown in FIG. 5A, the common base terminal group 100A1 includes the terminal F connected at one end to the negative-side brush BF and at the other end to an F lead wire of the regulator substrate, the terminal B connected at one end to the positive-side brush BB, at an middle end Bm connected to an output end of the rectifier, and at the other end to a B lead wire of the regulator substrate respectively, the terminal P connected at one end to one-phase output end Pr of the rectifier and at the other end to the a P lead wire of the regulator substrate, and the terminal E connected at one end to a bracket (earth) of the vehicle AC generator and at the other end to a E lead wire of the regulator substrate.

The common base terminal group 100A1 is formed by press-punching and shaping the respective terminals from a metal plate and connecting the respective terminals by premolding partly with resin so as to prevent these terminals from being separated.

Subsequently, the external connector terminal 200A1 will be described.

Figure 5B:
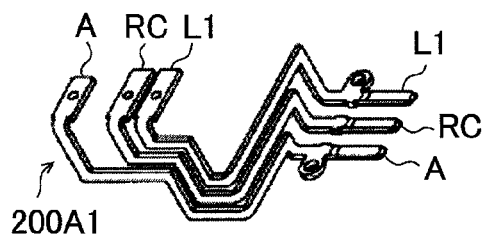

As shown in FIG. 5B, the external connector terminal 200A1 includes three individual connector terminals formed at one ends thereof with the male connector terminals A, RC, L1 to be inserted into the female connectors of respective external devices, and the connecting terminal portions A, RC, L1 to be connected to the male connectors and formed at the other ends thereof with insertion holes to which the A lead wire, the RC lead wire and the L1 lead wire of the regulator substrate are inserted and connected respectively.

As the individual connector terminals, the male connector terminal A is connected to a plus terminal of a battery for detecting the battery voltage, the male connector terminal RC as the individual connector is connected to a key switch and a charge display lamp on the vehicle side for controlling electric distribution to the regulator in association with the key switch, and the male connector terminal L1 as the individual connector terminal is connected to an ECU of the external device for monitoring a field current and sending the same to the ECU side.

Figure 5C:
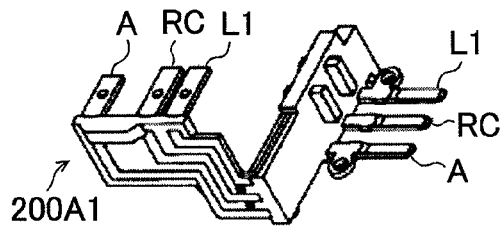

The individual connector terminals A, RC, L1 are respectively formed by press-punching and shaping a metal plate, and then are integrated by premolding partly with resin so as to prevent these terminals from being separated as shown in FIG. 5C to form the external connector terminal 200A1.

Figure 5D:
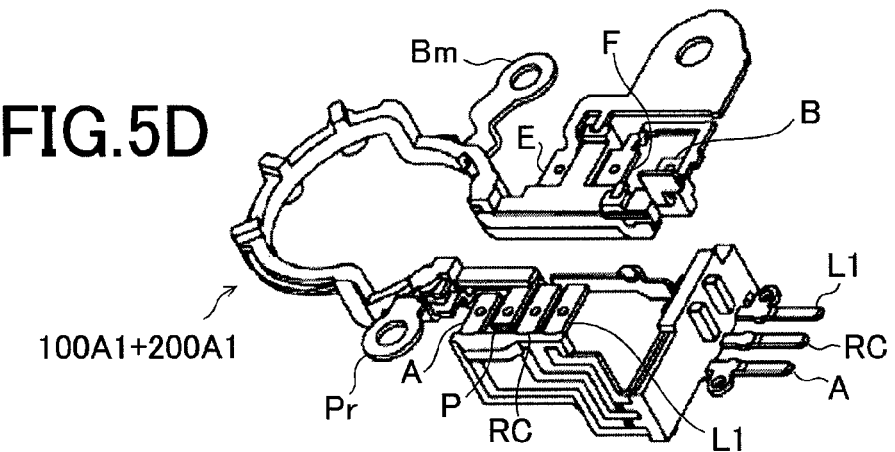
Figure 5E:
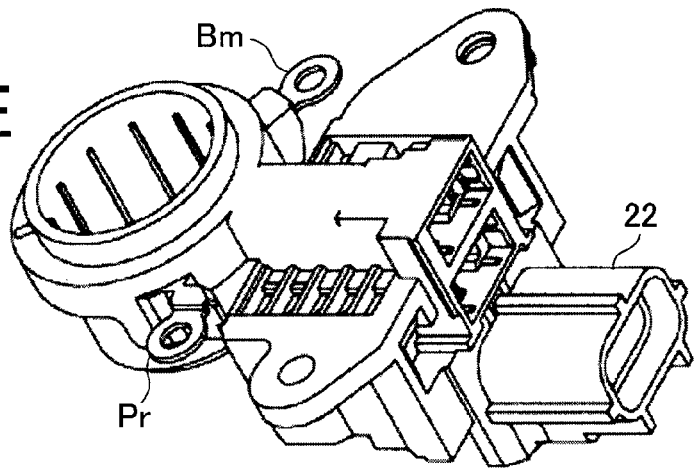

The common base terminal group 100A1 and the external connector terminal 200A1 configured as described above are integrally molded by being arranged in combination in a predetermined mold frame as shown in FIG. 5D, and filing resin in the mold frame to achieve integral molding as shown in FIG. 5E. Accordingly, the brush holder 11 for holding the brushes, a storage for storing the regulator substrate and the integrated circuit, the holding unit for holding the common base terminal group 100A1 and the external connector terminal 200A1, and the connector 22 are integrated.

As shown in FIGS. 4B, 4C, the integrated circuit is mounted to the regulator substrate 14P, the integrated circuit is covered by the case 14C, and the regulator substrate 14P and the heat sink 13 are bonded with adhesive agent in advance. Subsequently, since the seven lead wires are derived from the regulator substrate 14P which is integral with the heat sink 13 on the side opposite from the heat sink, these seven lead wires are inserted into the respective connecting holes of the common base terminal group 100A1 and the external connector terminal 200A1, and the regulator substrate is securely bonded to an opening end of the regulator storage. Subsequently, resin such as silicon is filled from the opening of the regulator storage formed on top thereof in the radial direction and cured.

FIG. 6 shows a configuration of the common base terminal group 100A2 and the external connector terminal 200A2 and a procedure for unifying these members in a case in which the number of terminals of the external connector terminal is four and the number of lead wires of the regulator substrate is eight, and is basically the same as those described in conjunction with FIG. 5. In other words, as shown in FIGS. 6B, 6C, the external connector terminal 200A2 includes four individual connector terminals, and has a configuration in which an individual connector terminal having a mail connector G to be connected to the ECU at one end and a connecting terminal portion G to be connected to a G lead wire of the regulator substrate at the other hand for supplying control signals on the ECU side of the engine to the regulator is added to the external connector terminal 200A1 in FIG. 5.

Figure 6A:
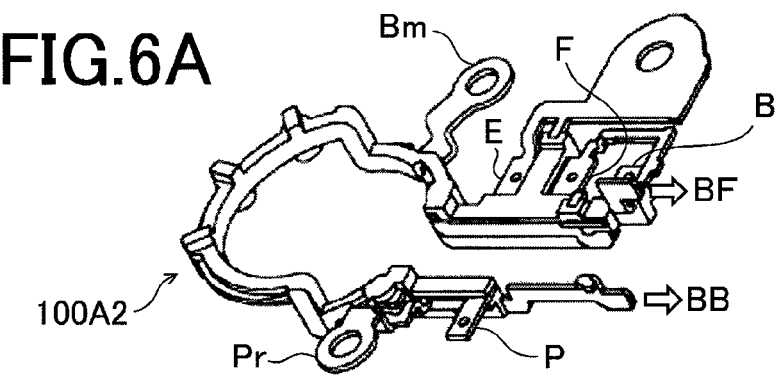
FIG. 6 shows configurations of a common base terminal group and an external connector terminal, and a procedure for unifying these members according to the first embodiment of the invention.
Figure 6B:
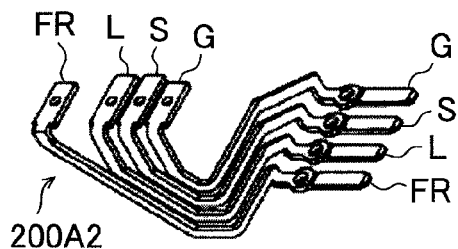
Figure 6C:
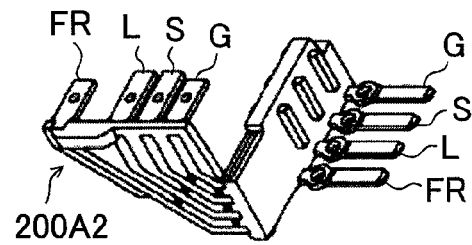

In FIGS. 6B, 6C, the male connector terminal S corresponds to the terminal A in FIG. 5 for detecting the battery voltage, and the male connector terminal L corresponds to the terminal RC in FIG. 5 for controlling electric distribution to the regulator in association with the key switch. The male connector terminal FR corresponds to the terminal L1 in FIG. 5 for monitoring the field current and sending the same to the ECU side.

Figure 6D:
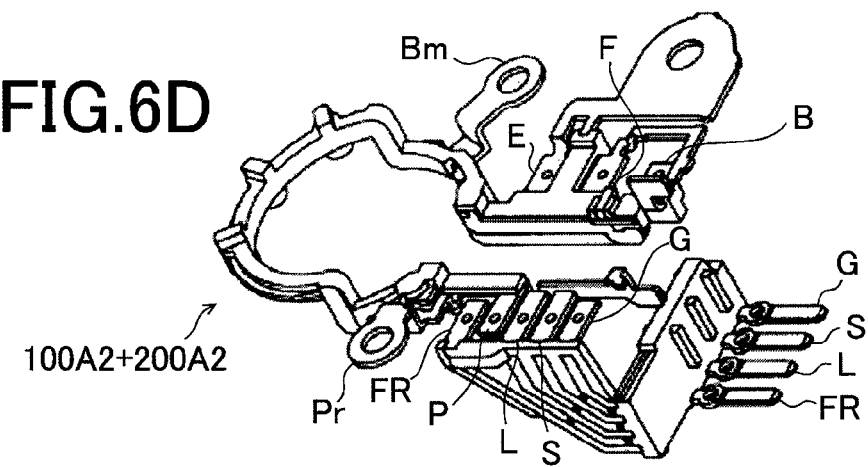
Figure 6E:
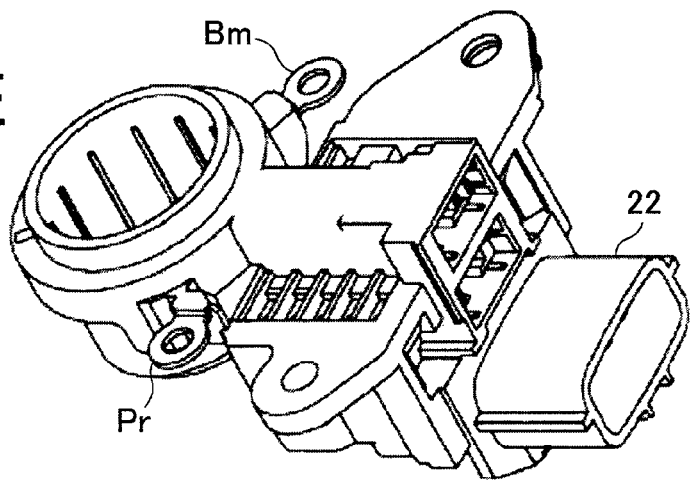

The external connector terminal 200A2 configured in this manner is integrally molded by being arranged in combination with the common base terminal group 100A2 in a predetermine mold frame as shown in FIG. 6D, and integrally molded by filling resin in the mold frame as shown in FIG. 6E. Accordingly, the brush holder 11 for holding the brushes, storage for storing the regulator substrate and the integrated circuit, a holding unit for holding the common base terminal group 100A2 and the external connector terminal 200A2, and the connector 22 are integrally configured.

With the configuration according to the first embodiment, since the male terminal portions for the connection with the external circuit are arranged in parallel to each other, the connector 22 assumes a flat shape. Therefore, the thickness in the axial direction is reduced and, the axial dimension may further be reduced as the regulator assembly in conjunction with the configuration in which the connector 22 projects in the radial direction.

Second Embodiment

Figure 7:
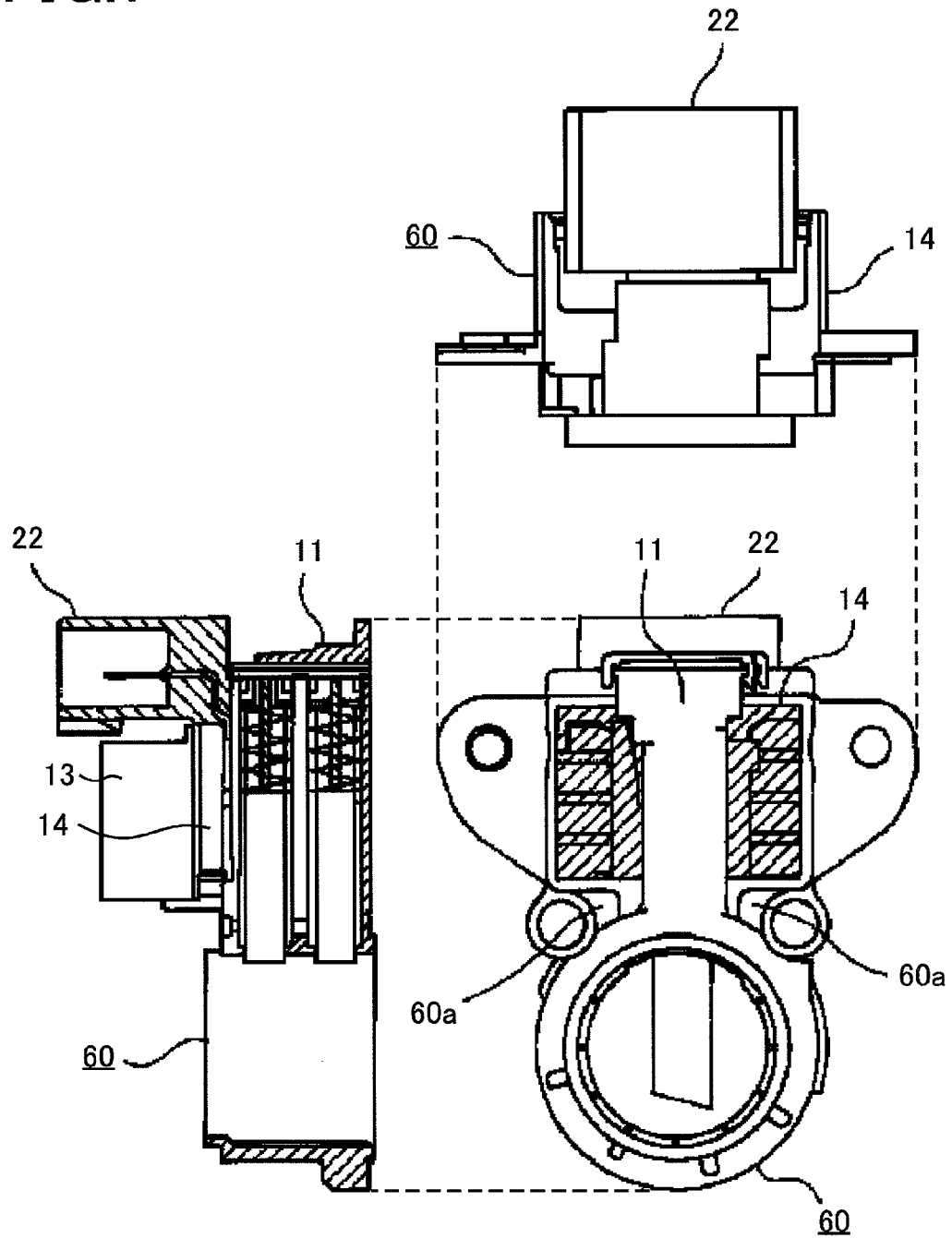
FIG. 7 illustrates another example of the terminal device of the vehicle AC generator according to a second embodiment of the invention, showing states viewed from the front, top and side of a regular assembly.

Referring now to FIG. 7 to FIG. 9, a second embodiment of the invention will be described. In the drawing, the same reference numerals as those of FIG. 4 to FIG. 6 designate the same or corresponding components, and duplicated description will be omitted.

FIG. 7 illustrates another example of the terminal apparatus of the vehicle AC generator according to the second embodiment of the invention, showing states viewed from the front, top and side of a regular assembly 60. The second embodiment is different from the first embodiment in that the opening of the connector 22 is faced to the rear direction of the generator (axial direction).

In other words, in the regular assembly 60 according to the second embodiment, the regulator 14 and the brush holder 11 are disposed so as to be overlapped in the axial direction of the generator, and the connector 22 is provided in adjacent to the regulator 14 radially outwardly of the regulator 14 and the opening of the connector 22 is faced to the rear direction (axial direction) of the generator. The reference numeral 60a designates air vent holes provided on both sides of the brush holder 11.

FIG. 8 and FIG. 9 show configurations of a common base terminal group and an external connector terminal, and a procedure for unifying these members according to the second embodiment. FIG. 8 illustrates a case in which the number of terminals of the external connector terminal is three, and FIG. 9 illustrates a case in which the number of terminals of the external connector terminal is four. As shown in FIGS. 8B, 8C, FIGS. 9B, 9C, an external connector terminal 200B1 (or 200B2) includes three (or four) individual connector terminals formed by press-punching and shaping the respective terminals from a metal plate and unifying the respective terminals by premolding partly with resin so as to prevent these terminals from being separated, and the male connector terminals L1, RC, A (or G, S, L, FR) for the connection with the external circuit are faced in the axial direction of the generator.

Figure 8A:
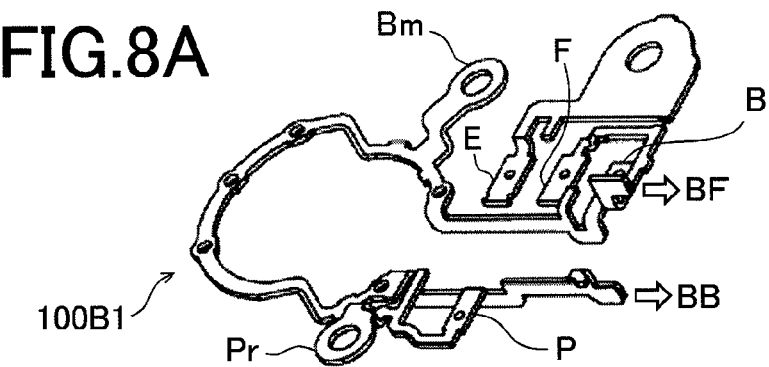
FIG. 8 shows configurations of a common base terminal group and an external connector terminal, and a procedure for unifying these members according to the second embodiment of the invention.
Figure 8B:
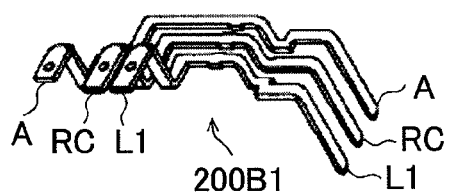
Figure 8C:
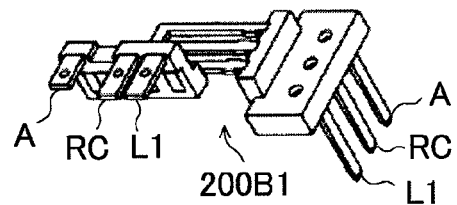
Figure 8D:
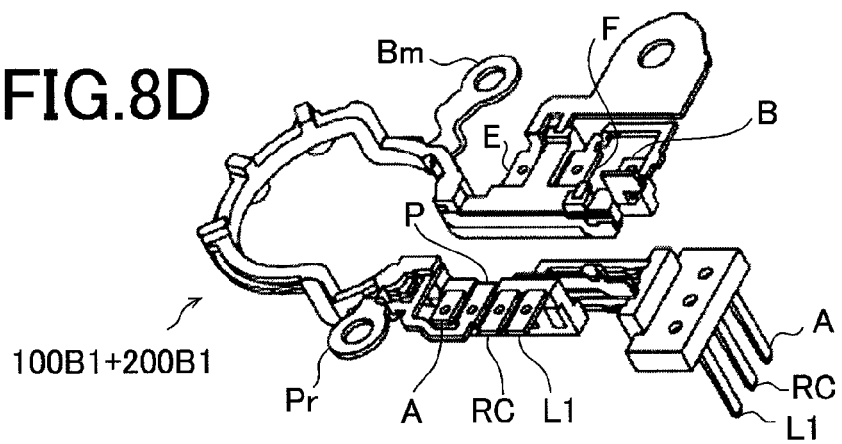
Figure 8E:
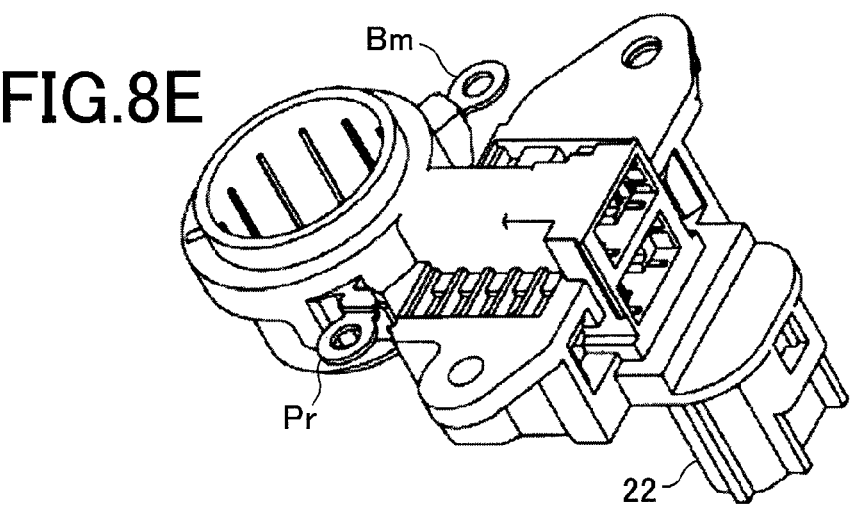
Figure 9A:
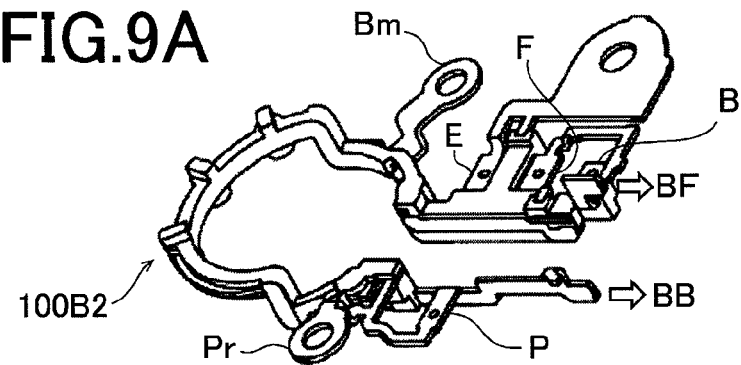
FIG. 9 shows configurations of a common base terminal group and an internal connector terminal, and a procedure for unifying these members according to the second embodiment of the invention.
Figure 9B:
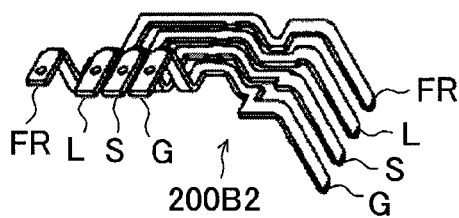
Figure 9C:
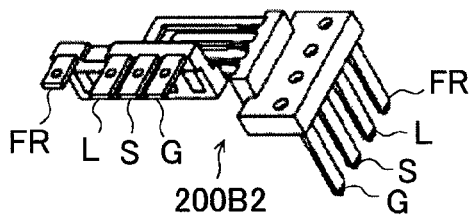
Figure 9D:
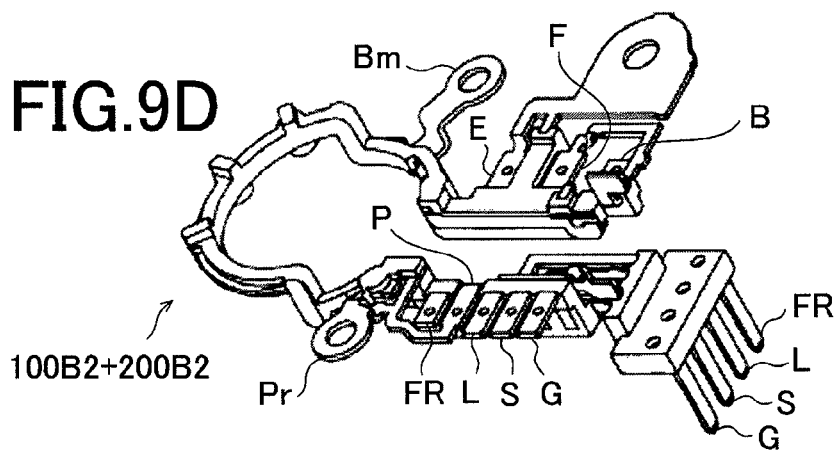
Figure 9E:
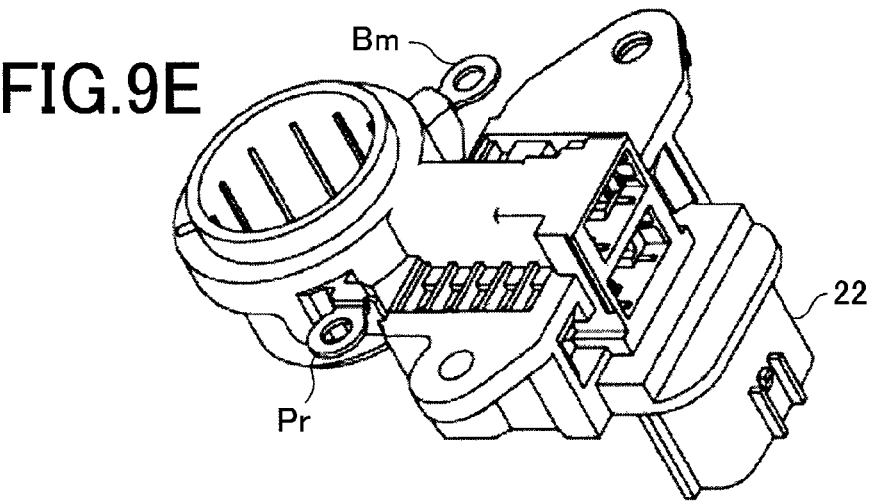

The external connector terminal 200B1 (or 200B2) and the common base terminal group 100B1 (or 100B2) configured in this manners are integrally molded by being arranged in combination in predetermined mold frame as shown in FIG. 8D (or FIG. 9D), and filling resin in the mold frame to achieve integral molding as shown in FIG. 8E (or FIG. 9E). Accordingly, the brush holder 11 for holding the brushes, the storage for storing the regulator substrate and the integrated circuit, the holding unit for holding the common base terminal group 100B1 (or 100B2) and the external connector terminal 200B1 (or 200B2), and the connector unit 22, and the opening of the connector 22 are faced in the direction of the axis of the generator.

According to the second embodiment, since the opening of the connector 22 is faced in the axial direction, downsizing in the radial direction is achieved and, in addition, since the male terminal portions for connecting the external circuit are arranged in parallel to each other, the connector 22 assumes a flat shape. Therefore, the radial dimension may further be reduced as a regulator assembly in association with the configuration in which the connector 22 projects in the axial direction.

As described above, according to the terminal device of the vehicle AC generator in the first embodiment and the second embodiment of the invention, by integrally molding one of the plurality of external connector terminals in combination with the common base terminal group, a desired regulator case using the same the common base terminal group in common is obtained, and the combination of the common base terminal group and the external connector terminal may be achieved only by setting them in the mold frame in desired arrangements respectively. Therefore, a terminal device for the vehicle AC generator which is easily adaptable for various vehicle-side connectors which have various numbers of the external connecting terminals and have various orientations and shapes and which achieves low manufacturing cost and high reliability is obtained.

More specifically, a process of electrical connection such as soldering, welding or the like between terminals of the common connector and the individual connectors in the related art is no longer necessary, and hence the process which is fine and requires reliability in a small space may be eliminated. In addition, coating of the terminal pairs between the common connector and the individual connectors with insulating resin or fit a molded cap formed of insulating material to secure insulation between the adjacent terminal pairs with respect to each other. Consequently, the number of processes of manufacture maybe reduced, so that the terminal device for the vehicle AC generator with low manufacturing cost and high reliability is obtained.

What is claimed is:

1. A terminal device for a vehicle AC generator comprising: a base terminal group having a plurality of terminals including a brush terminal and an earth terminal; and a connector terminal formed by integrating a plurality of individual connector terminals including a terminal to be connected to a battery, and connecting terminals which serve as connector units with respect to the external device at one ends thereof and having connecting terminal portions to be connected to a regulator circuit at the other ends thereof by premolding with respect to each other, wherein a brush holder for holding brushes, a storage for storing circuit boards of the regulator, a holding unit for holding the base terminal group and the connector terminal, and the connector unit of the connector terminal are integrated by combining the connector terminals with the base terminal group and arranging them at predetermined positions of the base terminal group, and integrally molding the base terminal group with the connector terminal with resin.

2. The terminal device for a vehicle AC generator according to claim 1, wherein the respective terminals of the base terminal group are premolded.

3. The terminal device for a vehicle AC generator according to claim 1, wherein the connector unit of the connector terminal is arranged adjacent to the storage on the outer peripheral side thereof.

4. The terminal device for a vehicle AC generator according to claim 1, wherein the connector unit of the connector terminal projects in the radial direction of the vehicle AC generator.

5. The terminal device for a vehicle AC generator according to claim 1, wherein the connector unit of the connector terminal projects in the direction of the axis of the vehicle AC generator.

6. The terminal device for a vehicle AC generator according to claim 1, wherein the storage for the circuit board of the regulator is provided on one side surface of the brush holder in terms of the axial direction thereof.

7. The terminal device for a vehicle AC generator according to claim 1, wherein the connector terminal includes three or more terminals for the connection with respect to the external device arranged in parallel to each other.

* * * * *